United States Patent [19]

Nurano

[11] Patent Number: 4,807,971
[45] Date of Patent: Feb. 28, 1989

[54] OPTICAL DECORATIVE APPARATUS

[76] Inventor: Hideo Nurano, 2352-2, Horinouchi, Hachiozi-shi, Tokyo, Japan

[21] Appl. No.: 118,956

[22] Filed: Nov. 12, 1987

[30] Foreign Application Priority Data

Nov. 28, 1986 [JP] Japan .................... 61-184405[U]
May 12, 1987 [JP] Japan .................... 62-70472[U]

[51] Int. Cl.⁴ .............................................. G03H 1/22
[52] U.S. Cl. .................................. 350/13.6; 350/3.76; 350/3.85
[58] Field of Search ................ 350/3.6, 3.76, 3.85

[56] References Cited

U.S. PATENT DOCUMENTS 4,429,946 2/1984 Haines ............................... 350/3.76

OTHER PUBLICATIONS

Huff, L. et al, "Optical Techniques for Increasing Image Width in Cylindrical Holographic Stereograms", *Optical Eng.*, vol. 20, No. 2, Mar./Apr. 1981, pp. 241–245.

*Primary Examiner*—Bruce Y. Arnold
*Attorney, Agent, or Firm*—Schweitzer & Cornman

[57] ABSTRACT

An optical decorative apparatus for producing a three-dimensional image in the inside space of a drum-shaped hologram film by means of light, the apparatus including a dividable casing of lower and upper parts, light equipment, a rotatably supported cylinder-shaped rotary stand surrounding the light equipment, a motor for rotating the rotary stand, said light equipment, rotary stand and motor being arranged inside the lower casing part, and further a drum-shaped hologram film fitted on the rotary stand, wherein the upper casing part is releasably coupled to the lower casing part so as to enclose the drum-shaped hologram film.

6 Claims, 5 Drawing Sheets

OPTICAL DECORATIVE APPARATUS

BACKGROUND OF THE INVENTION

The present invention relates to an optical decorative apparatus designed to produce a three-dimentional moving image in the inside space of a drum-shaped hologram film allowed to rotate on its axis by light radiated from below.

It is known in the art to use an optical decorative apparatus of such nature, as an educational material. However, the conventional optical decorative apparatus for educational use is greatly liable to incur any damage of breakage or the like unavoidably because the drum-shaped hologram film is disposed in a bare condition, thereby being difficult to be employed as an indoor ornament adapted for domestic or commercial use. Accordingly, to prevent against such damage, it may be possible to enclose the outside of the apparatus with a casing. However on an occasion of fixing the casing by setscrews on structual members; a rotary stand for supporting a hologram film and a base rest for equipping a motor, the replacement with other hologram film comes into much troublesome work because of needing extra labor in fitting and removing the setscrews.

A primary object of the present invention is to provide an optical decorative apparatus adapted to be used as a domestic or commercial indoor ornament.

A further object of the present invention is to provide an optical decorative apparatus capable of easily replacing with other drum-shaped hologram films.

Other objects and advantages of the present invention will be apparent from the following description of embodiments taken in connection with the accompanying drawings in which.

DETAILED DESCRIPTION OF THE PREFERRED EMBODIMENTS

Figure 1:
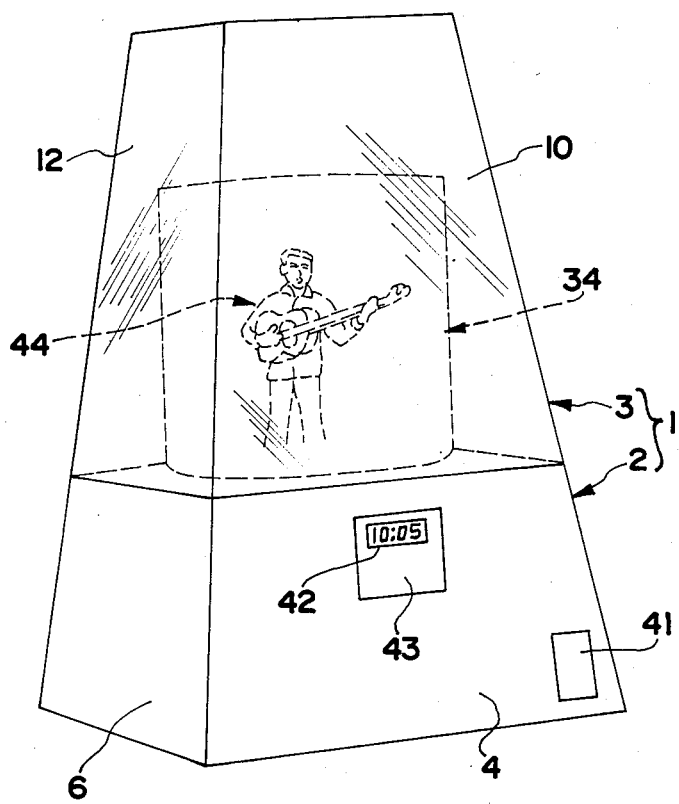
FIG. 1 is a perspective view of a preferred embodiment of an optical decorative apparatus according to the present invention.
Figure 2:
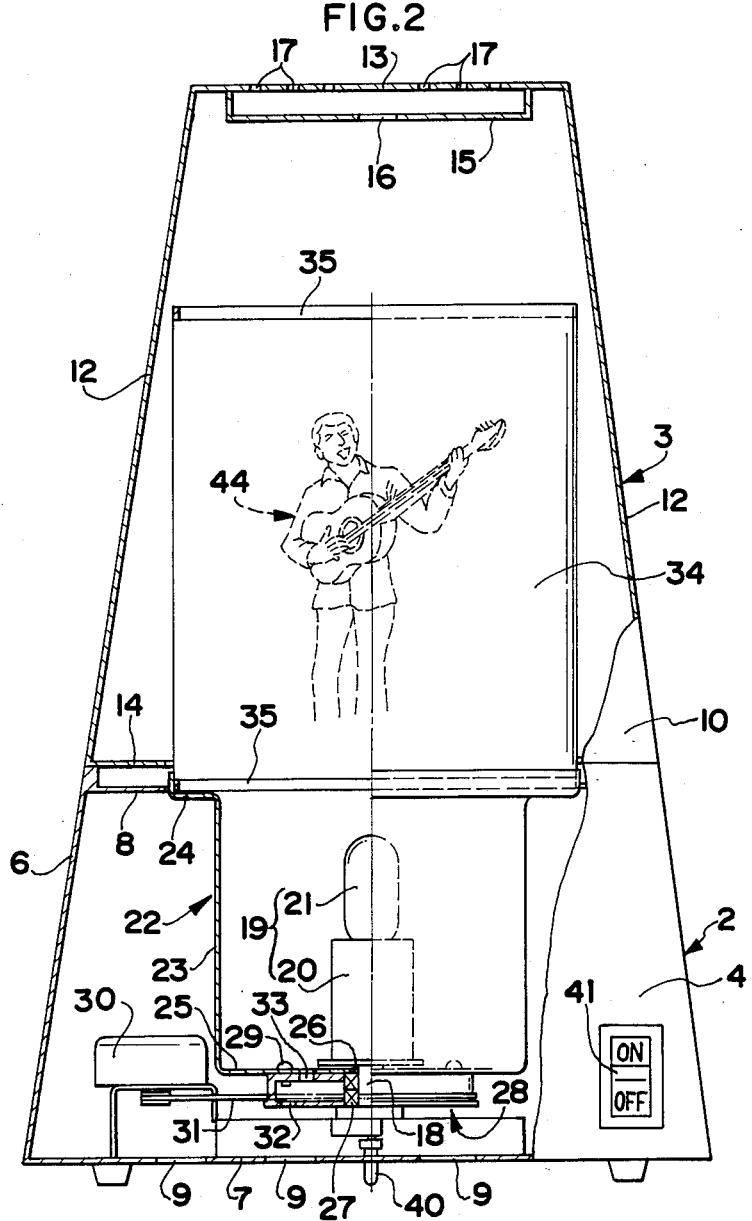
FIG. 2 is an enlarged vertical section through the apparatus of FIG. 1.

Referring to FIGS. 1 through 4, the optical decorative apparatus to the present invention includes a casing shaped like a truncated quadrilateral pyramid, which is constructed so as to be dividable into two parts, i.e. a lower casing part 2 and an upper casing part 3. Both these casing parts are made up respectively of semi-transparent blackish plates of plastics. In detail, the lower casing part 2 has the walls formed by a front plate 4, a back plate 5, both right and left side plates 6, 6 and a bottom plate 7. These lateral plates 4, 5, 6, 6 are provided with a line of flanges 8 around the inside upper parts thereof, while the bottom plate 7 is provided with a plurality of air passing holes 9 threrethrough. On the other hand, the upper casing part 3 has the walls formed by a front plate 10, a back plate 11, both right and left side plates 12, 12 and a top plate 13. These lateral plates 10, 11, 12, 12 also are provided with a line of flanges 14 round the inside lower parts thereof in such a manner as to be opposite to the above-mentioned flanges 8 of the lower casing part 2, while the top plate 13 is provided with a tray-shaped internal plate 15 on the undersurface. The internal plate 15 has an air passing hole 16 formed in the center, while the top plate 13 is provided with a plurality of air passing apertures 17 at the outlying positions away from the center opposite to the above-mentioned air passing hole 16 of the plate 15. As apparent from FIGS. 1 and 2 showing a condition in which the upper casing part 3 is fitted onto the lower casing part 2, the front, back, right and left side plates 4, 5, 6, 6 of the upper casing part 3 are allowed to be continous and flush with the respectively corresponding plates 10, 11, 12, 12 of the lower casing part 2.

Inside the lower casing part 2, there are erected a stationary shaft 18 over the center of the bottom plate 7, on which a lighting equipment 19 is installed. The lighting equipment 19 consists of a socket 20 fitted to the upper part of the stationary shaft 18, and a special electric light bulb 21 fitted into the socket. Its power cord is, although omitted in the drawings, stretched outwards through the inside of the stationary shaft 18 and the bottom plate 7.

Further inside the lower casing part 2, there is provided a rotary stand 22 shaped like a cup open upwards, so as to surround the light equipment 19. The upper end of the cylindrical side wall of the rotary stand 22 is configured into an annular supporting ledge 24 for supporting a drum-shaped hologram film 34 described below. The rotary stand 22 is supported rotatably, that is, in a state of loosely penetrating the stationary shaft 18 into a hole 26 formed in the center of the bottom of the rotary stand 22, the stand 22 is fixed by setscrews 29 on a turntable 28 which is held rotatably through bearings 27 with respect to the stationary shaft 18. The turntable 28 is allowed to rotate by a driving belt 31 connected to an electric motor 30, so that the rotary stand 22 rotates with the turntable 28. In the turntable 28 and the bottom of the rotary stand 22, there are provided air passing apertures 32, 33 communicating with each other.

On the above-mentioned rotary stand 22, there is placed a drum-shaped hologram film 34 coaxially therewith, which drum-shaped hologram film 34 is produced through the processes of rolling a sheet of elongated hologram film into a hollow cylinder, and of then bonding its overlapped ends together by a suitable adhesive means. In addition, the upper and lower ends of the drum-shaped hologram film are surrounded by rings 35 to keep the shape constant. The drum-shaped film 34 is stabilized, since the lower end of the film is fitted tightly onto the supporting ledge 24 of the rotary stand 22. On the hologram film itself, there are recorded scenes shot from a fixed position by a special camera, for example, of a player acting on the rotating stage of a theather.

Figure 3:
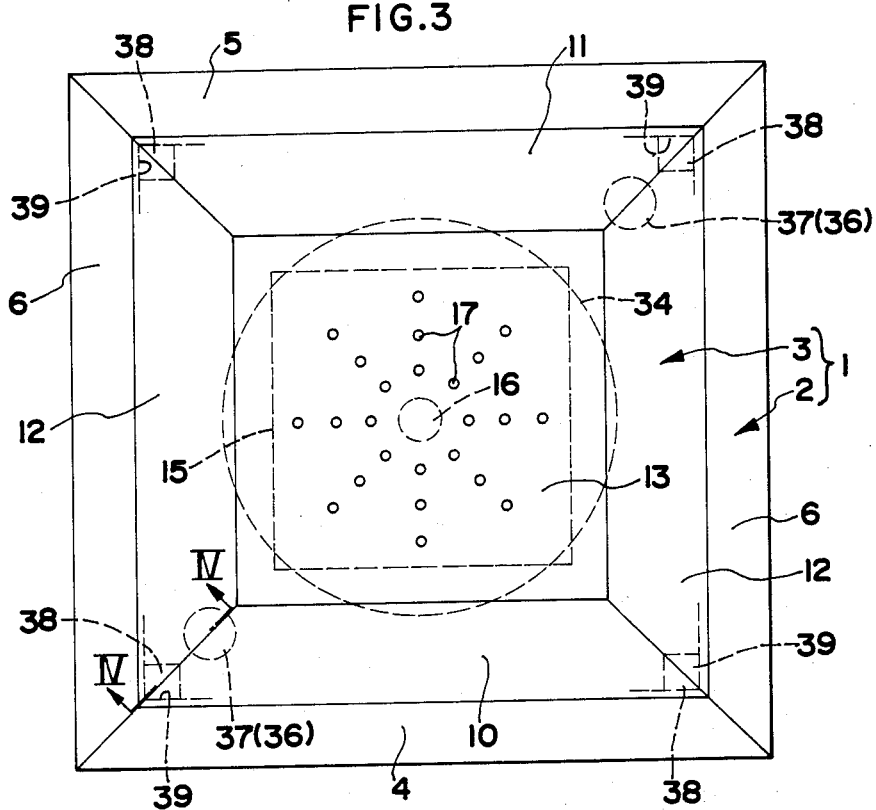
FIG. 3 is a plan view of the apparatus of FIG. 1.
Figure 4:
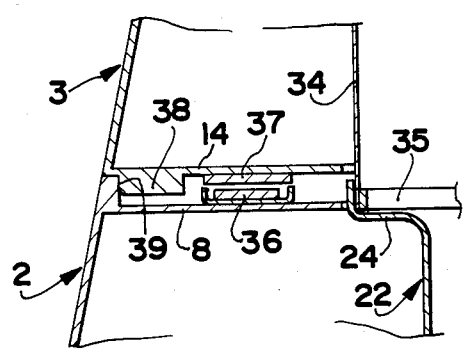
FIG. 4 is an enlarged vertical section taken on the line IV—IV of FIG. 3.

Further, as shown in FIGS. 3 and 4, on the uppersurface of the flanges 8 of the lower casing part 2, there are mounted a pair of permanent magnets 36, 36 at two positions opposite on a diagonal line. On the other hand, on the undersurface of the flanges 14 of the upper casing part 3, there are mounted a pair of pieces of iron 37, 37 at two positions corresponding to those of the above-mentioned magnets. By such a construction, the upper casing part 3 is firmly stabilized on the lower casing part 2, since the magnets attract the pieces of iron whenever the former casing part 3 is fitted on the latter casing part 2. Besides, the flanges 14 of the upper casing part 3 have projecting parts 38 shaped downwards on the undersurface at the four inside corner section, while the flanges 8 of the lower casing part 2 have denting parts 39 on the uppersurface at the corresponding positions to the projecting parts 38. Accordingly, by engaging the projecting parts 38 with the denting parts 39, the upper casing part 3 is located at the determined position on the lower casing part 2, and furthermore both the upper and lower casings 2, 3 are connected into one body by the attractive action of the magnet pieces 36.

In the state of penetrating the bottom plate 7 of the lower casing part, a cutout switch pin 40 is protruded dounwards by force, for example, by means of biasing spring, which pin 40 is ordinally in contact with the surface of an installation place of the present apparatus. In the case the present apparatus in use is caused to fall down, the pin 40 becomes free from the contact with the surface of the installation place whereby the electrical circuit is opened off, and then the motor 30 and the light bulb 21 is gone into no operation. In other words, the pin 30 functions as an automatic switch. The reference numeral 41 denotes a power switch, and the numeral 42 denotes a digital clock mounted in the front plate 4 of the lower casing part 2 by means of a fixing plate 43.

In the operation of the optical decorative apparatus constructed as described above, when the switch 41 is turned on, the motor 30 begins to work, so that the rotary stand 22 and drum-shaped hologram film 34 rotate on its axis through the driving belt 31 while the light bulb 21 begins to brighten and then illuminates the hologram film. As a result, in the inside space of the drum-shaped hologram film 34, there is produced a three-dimentioned moving image 44, for example, of a guitarist playing his guitar as shown by chain lines in FIGS. 1 and 2.

On the other hand, the air inside the drum-shaped hologram film 34 is caused to warm by the light radiated from the bulb 19, so that there is a possibility of the film suffering much excessive heat and thus scorching. However, in the present apparatus, the above-mentioned warmed air ascends and escapes outwards through the air passing hole 16 and apertures 17, whereas the outside air which is relatively cool is drawn into the lower casing part 2 through the air passing holes 9 defined in the bottom plate 7, and then flows upwards through the air passing apertures 32, 33 of the turntable 28 to the inside space of the rotary stand 22. Thus, the circulation of the air current is effected between the inside and the outside of the casing 1 and ventilates the inside space of the casing 1, thereby preserving the hologram film from being overheated. If required, a cooling fan may be provided in the lower casing 2 to perform such circulation and ventilation more efficiently.

In addition, the hole 16 of the internal plate 15 is covered right over with the top plate 13 of the upper casing part 3, so that the light radiated from the electric bulb 19 is obstructed and thus never escapes directly outside the upper casing part 3.

In the above embodiment, the lower and upper casing part 2, 3 are made up of semitransparent blackish plates of plastics, but may employ respectively opaque plates of plastics or the like, and transparent plates.

The optical decorative apparatus described above of the present invention is constructed such that the drum-shaped hologram film 34 is enclosed by the upper casing part 3; consequently the present apparatus can be used as a domesitc or commercial indoor ornament. In addition, since the present optical decorative apparatus is constructed such that the casing 1 is dividable into both of the lower casing part 3 for accommodating the light equipment 19, the rotary stand 19, the motor 30 and the like, and the upper casing part 3 for enclosing the drum-shaped hologram film 34, and such that the latter casing part 3 is allowed to locate and fasten releasably at the determined position on the former casing part 3 by means of the projecting and denting parts 38, 39 and the magnetic materials 36, 37, it is possible to facilitate the replacing work of drum-shaped hologram films 34.

Figure 5:
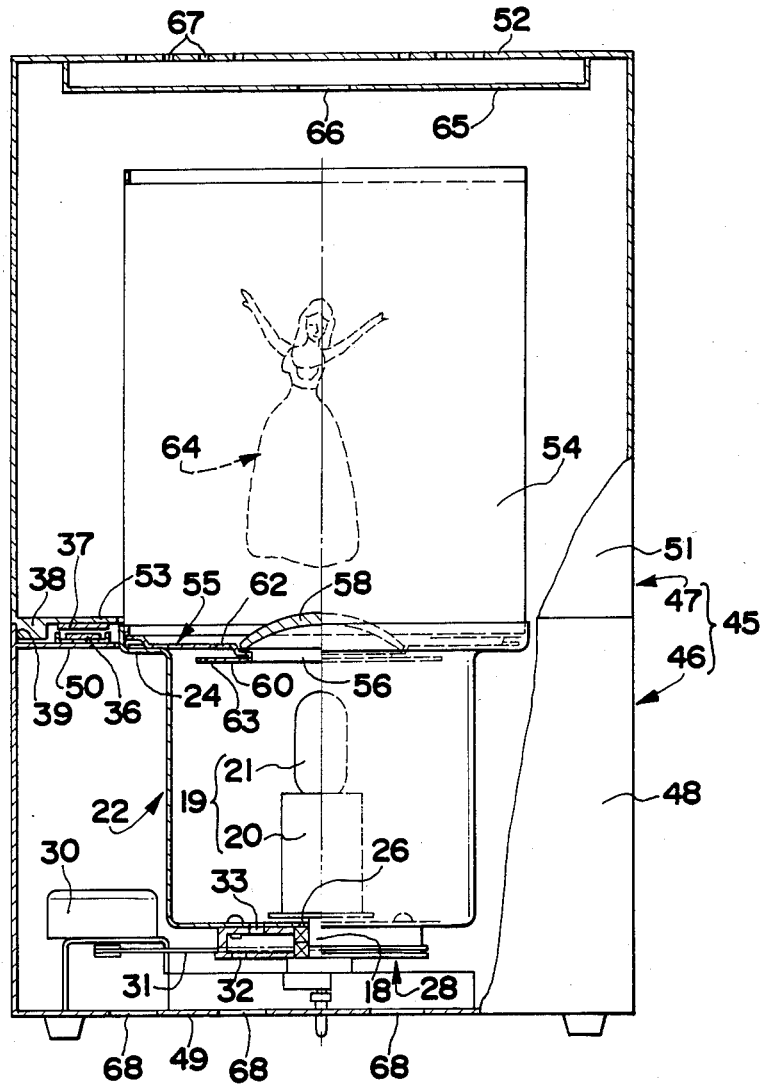
FIG. 5 is an enlarged vertical section through another embodiment of an optical decorative apparatus according to the present invention.
Figure 6:
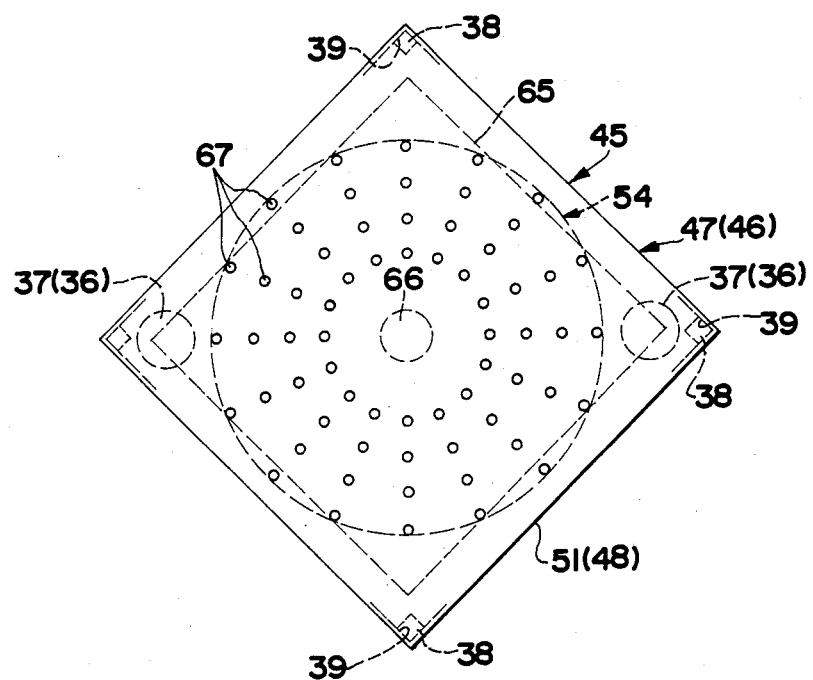
FIG. 6 is a plan view of the apparatus of FIG. 5.
Figure 7:
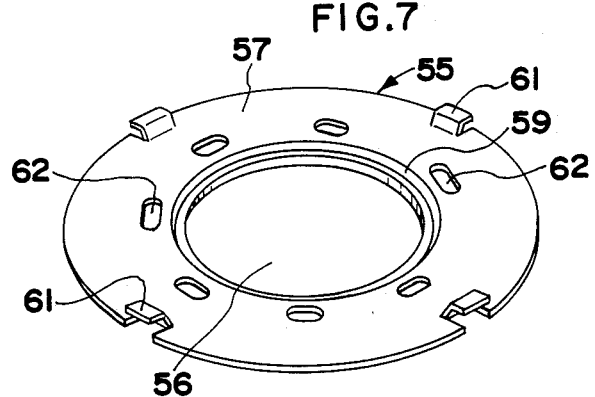
FIG. 7 is a perspective view of a screening plate used in the embodiment of FIG. 5.

A further embodiment of the present invention is illustrated in FIGS. 5 and 6, wherein the same refernce numerals are given the same constructional elements as those in FIGS. 1–4, except different elements which are described in particulars below.

The further optical decorative apparatus includes a casing 45 which is shaped externally like an oblong box by the use of semitransparent plates of plastics. Moreover, the casing 45 consists of a lower casing part 46 and an upper casing part 47 similarly to the first embodiment. The lower casing part 46 is made up of four lateral walls 48 . . . , a bottom wall 49, and a line of flanges 50 provided round the inner upper parts of every lateral walls. The upper casing part 47 also is made up of four lateral walls 51 . . . , a top wall 52, and a line of flanges 53 provided round the inner lower part of every lateral walls. A line of flanges 50 of the lower casing 46 are provided with permanent magnet pieces 36 and denting parts 39 at the determined positions on the uppersurface, while a line of flanges 53 of the upper casing part 47 are provided with pieces of iron 37 and projection parts 38 respectively at the determined positions on the undersurface, corresponding to the positions of mentioned magnet pieces 36 and denting parts 39. Thus, when the upper casing part 47 is fitted on the lower casing 46, both the casing parts 46, 47 are connected into one body by the attraction of the magnets 39 for the iron pieces 37, while the casing parts 46, 47 are allowed to be located by the engagement of the projecting parts 38 and denting parts 39.

The drum-shaped hologram film 54 is supported by the ledge 24 of a rotary stand 22 which is arranged in the lower casing part 46. Between the ledge 24 of the stand 22 and the lower end of hologram film 54 described above, a screening plate 55 is interposed, 46. The screening plate 55 is made of metal and shaped like a disc in outline so as to fit onto the annular ledge 24 of the rotary stand 22. The screening plate 55 includes an annular body 57 having an opening 56 in the center. The body 57 is provided along its interior cirular border with a circular depressed step 59 to allow a convex lens 58 to rest on it, and with a parallel flange 60 extending externally from the lower edge of the interior border. In addition, the body 57 is provided at regular intervals along its exterior circular border with a plurality of supporting pieces 61 to project upwards, and further is provided at regular intervals near the interior border with a plurality of air passing apertures 62. Moreover, the flange 60 also is provided with a plurality of air passing apertures 63 at such positions as to be externally away in respect to the above-mentioned air passing apertures 62 of the body 57.

When the screening plate 5, of which the depressed step 57 is ready to receive the convex lens 58, is fitted onto the ledge 24 so as to cover the upward opening of the upper end of the rotary stand 22, the screening plate 5 is adapted to obstruct the light radiated from electric bulb 21, except the place occupied by the convex lens 58 right over the electric bulb 21. As a result, the convex lens allows the light radiated from the bulb 21 to illuminate more effectively the hologram film 54.

In the operation of the further apparatus constructed as described above, the drum-shaped hologram film 54 is allowed to rotate on its axis by the rotation of a motor 30, while being illuminated by the light bulb 19 after switching on. As a result, in the inside space of the drum-shaped hologram film 54, there is produced a three-dimentioned moving image 64, for example, of a dancing girl shown by chain lines in FIG. 5. In this occasion, the light radiated from the light bulb 19 is allowed to illuminate the hologram film 54 more effectively by the convex lens 58, so that the produced image 64 becomes still clearer and more vivid.

In addition, while the apparatus is in use, once the air inside both of the rotary stand 22 and the drum-shaped hologram film 54 is caused to warm by the light radiated from the bulb 21, the warmed air ascends and escapes outwards through the respective air passing holes 66, 67 of the internal and top plates 65, 52 of the upper casing 47. On the other hand, the outside air which is relatively cool is drawn into the lower casing 68 through the air passing holes 68 of the bottom plate 49, and then flows upwards through the air passing holes 32, 33 of the turntable 28 and further the inside of the rotary stand 22 to the air passing apertures 63, 62 of the screening plate 55. As a result, The inside space of the casing 45 is ventilated by the air circulation generated between the inside and outside of the casing 45.

Accordingly, the following advantages are gained over the further apparatus described above. The light equipment 19 set up inside the casing 45 is limited in sight from the outside owing to the screening plate 55 covering it, whereby it is possible to allow observers to keep their eyes upon the three-dimentioned image 64 without taking notice of the light equipment, and thus to give a greatly nice impression to the observer. Furthermore, owing to the convex lens 58 fitted around the central opening 56 of the screening plate 55, the light radiated from the light bulb 19 is allowed to illuminate the drum-shaped hologram film 54 more effectively, whereby it is possible to produce a three-dimentional image 64 much clearly and vividly in the inside space of the hologram film 54.

What is claimed is:

1. An optical decorative apparatus, comprising:
   a casing constructed dividably into a lower casing part and a substantially transparent upper casing part;
   a light equipment,
   a hollow cylinder-shaped rotary stand supported rotatably, which surrounds the light equipment, and
   a motor for rotating the rotary stand,
   said light equipment, rotary stand and motor being arranged inside the lower casing part;
   a drum-shaped hologram film fitted into the upper part of the rotary stand;
   wherein the upper casing part is releasably coupled to the lower casing part so as to enclose the drum-shaped hologram film.

2. An optical decorative apparatus as defined in claim 1, further comprising:
   an annular screening plate with a convex lens provided in the center thereof, which is fitted onto an upper end of the cylindrical rotary stand in such a manner as to cover an upward opening surrounded by the upper end, and as to allow the convex lens to be located right over the light equipment.

3. An optical decorative apparatus as defined in claim 1 or 2, further comprising:
   a pair of pieces of magnetic substances capable of attracting one another, which are attached respectively to opposite end parts of the lower and upper casing parts.

4. An optical decorative apparatus as defined in claim 3, wherein one of said pair of pieces of magnetic substances is a piece of permanent magnet, while the other is a piece of iron.

5. An optical decorative apparatus as defined in any of claim 1, 2, 3, or 4, wherein a pair of projecting and denting parts allowed to engage with one another for locating are provided respectively on opposite end parts of the lower and upper casing parts.

6. An optical decorative appartus as defined in any of claim 1, 2, 3, 4, or 5, wherein a plurality of air passing holes are configured respectively in a bottom wall plate of the lower casing part and in a top wall plate of the upper casing part.

* * * * *